United States Patent [19]

Lindbeck

[11] Patent Number: 4,586,600
[45] Date of Patent: May 6, 1986

[54] CONVEYOR BELT CLEANER TENSIONING DEVICE

[75] Inventor: Michael J. Lindbeck, Neponset, Ill.

[73] Assignee: Martin Engineering Company, Neponset, Ill.

[21] Appl. No.: 688,735

[22] Filed: Jan. 4, 1985

[51] Int. Cl.[4] ............................................. B65G 45/00
[52] U.S. Cl. ..................................................... 198/499
[58] Field of Search ............... 198/497, 499; 15/256.5, 15/256.6, 93 R

[56] References Cited

U.S. PATENT DOCUMENTS 4,265,358  5/1981  Veenhof ........................ 15/256.5 X

FOREIGN PATENT DOCUMENTS 1066949  10/1959  Fed. Rep. of Germany ...... 198/497
0692763  10/1979  U.S.S.R. ............................... 198/499

Primary Examiner—Joseph E. Valenza
Assistant Examiner—D. Glenn Dayoan
Attorney, Agent, or Firm—McWilliams, Mann, Zummer and Sweeney

[57] ABSTRACT

A tensioning arrangement is provided to position belt cleaner blades relative to a conveyor belt, which arrangement includes a linkage connection to vary the force which the blades exert against the belt and an over-center camming feature which locks the blade in the cleaning position to prevent disengagement.

3 Claims, 6 Drawing Figures

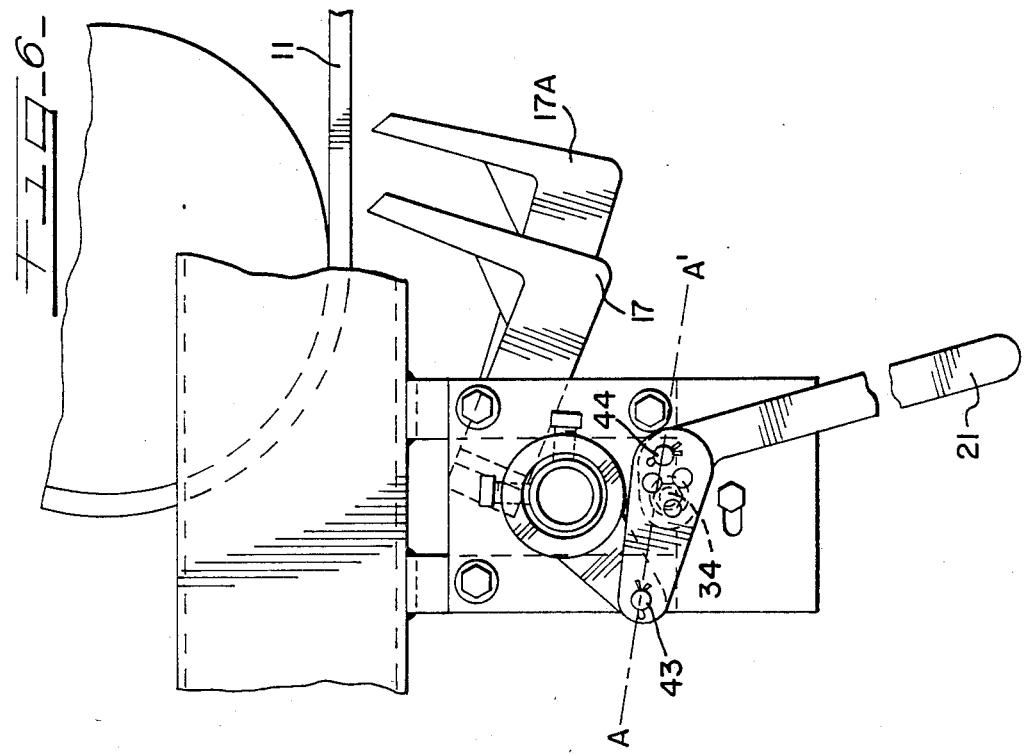
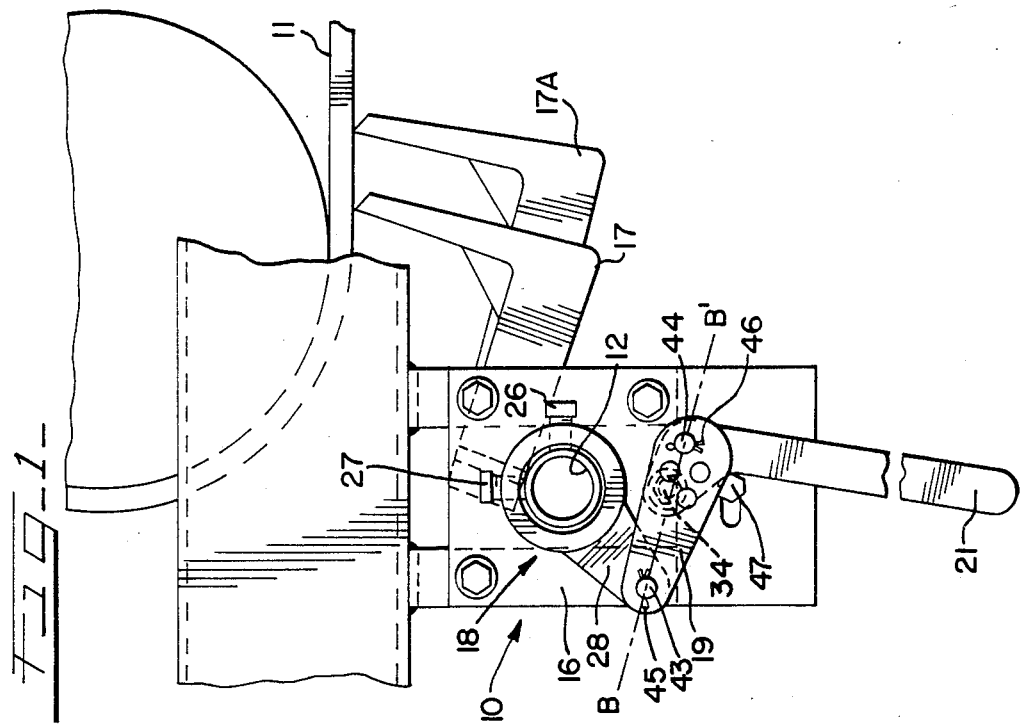

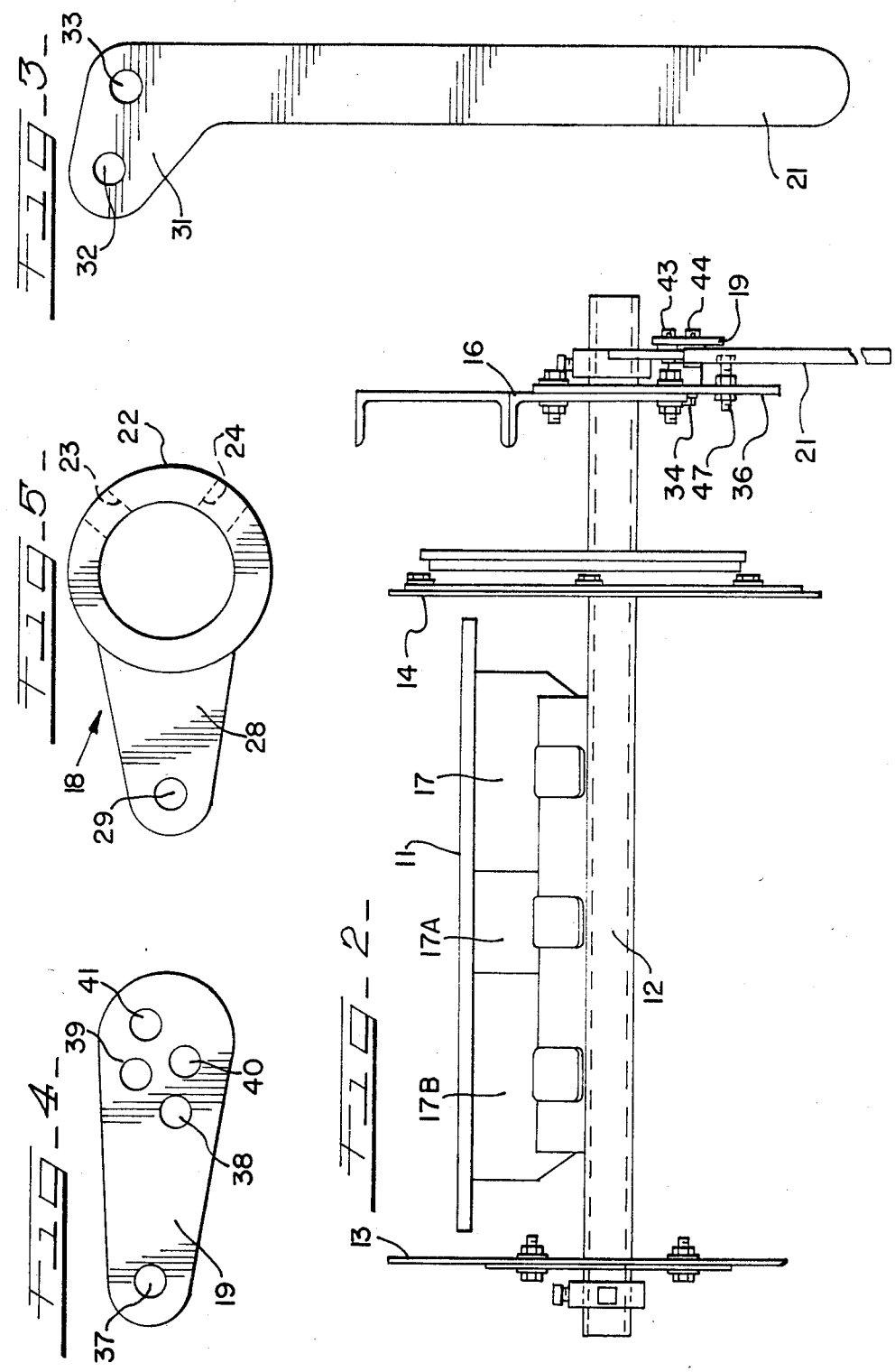

CONVEYOR BELT CLEANER TENSIONING DEVICE

BACKGROUND OF THE INVENTION

It has been known in the prior art to provide a mounting arrangement for conveyor belt cleaners whereby the cross-shaft on which the cleaning blades are mounted can be rotated moving the cleaner blades either into or out of contact with the belt. This is accomplished by movement of a lever arm or ratchet connected to the cross-shaft and the subsequent locking of the arm and shaft against further rotation. Typical of prior art arrangements of this type is the ratchet tensioner disclosed in applicant's U.S. Pat. No. 4,098,394. This device achieves blade tensioning by means of a radial ratchet wrench and locks the blades against the belt through a pawl mechanism. This device is relatively expensive to manufacture, requires a ratchet wrench for operation, and only locks the blades against the belt for one direction of conveyor belt travel. If, for any reason, the direction of conveyor belt travel is reversed, the blades can be forced into the belt causing damage to the belt. Under sudden belt direction reversal, the ratchet handle may also spin with possible hazardous consequences to any persons in the immediate vicinity.

Other prior art arrangements are found in the U.S. Pat. No. 2,794,540, to Sinden, and U.S. Pat. Nos. 3,342,312, 3,994,384, 3,994,385, and 4,036,354, to Reiter.

SUMMARY OF THE INVENTION

The present invention provides a tensioning arrangement for conveyor belt cleaners which incorporates a variable force linkage connection including a handle, a crank, and a link which is operative, depending upon the position of the connection arrangement selected, to vary the force of engagement between the blade and the cleaner belt while, at the same time, providing an over-center camming arrangement which positively locks the blade in the cleaning position to prevent disengagement for either direction of conveyor belt travel. The present arrangement is less expensive to manufacture than prior art devices, is simple and safer in operation, and requires no tools for actuation.

DESCRIPTION OF THE DRAWINGS

FIG. 1 is a side view of the belt cleaner and tensioning arrangement of the present invention shown in the locked and belt-cleaning position.

FIG. 2 is a rear end view also showing the tensioner arrangement in the locked and belt-cleaning position.

FIG. 3 is a side view of the handle of the tensioner.

FIG. 4 is a side view of the link of the tensioner.

FIG. 5 is a side view of the crank of the tensioner.

FIG. 6 is a side view of the tensioner arrangement of the present invention showing the elements in the unlocked position in which the cleaner blades are out of contact with the belt.

DESCRIPTION OF THE PREFERRED EMBODIMENT

FIG. 1 shows a mounting and tensioner arrangement generally designated as 10 for cleaning a conveyor belt 11. The mounting arrangement includes a support shaft 12 mounted for rotation in conveyor housing side plates 13 and 14, best shown in FIG. 2. The shaft 12 also extends through a plate 16 positioned exteriorly and outwardly from the housing plate 14. A plurality of belt cleaner blades designated as 17, 17a, and 17b in FIG. 2 are mounted on the cross-shaft 12 by any of a number of accepted methods. The mounting arrangement shown in FIGS. 1 and 6 is more fully explained in applicant's co-pending application Ser. No. 579,707, filed on Feb. 13, 1984.

In order to rotate the shaft 12 to move the cleaner blades 17 into or out of engagement with the belt 11, a variable force tensioning arrangement is provided which includes a crank 18, a link 19, and a handle 21.

As best shown in FIG. 5, the crank element 18 includes a circular hub 22 adapted to slide over the shaft 12. The hub includes a pair of threaded apertures 23, 24 which are adapted to receive set screws 26, 27, which secure the crank 18 to the shaft 12 for rotational movement therewith. The crank 18 also includes a radially-extending arm 28 which includes an aperture 29 provided toward its outer end.

The handle 21, illustrated in FIG. 3, includes an arcuately-shaped, upper end 31 which defines a pair of apertures 32 and 33 spaced from each other. A bolt or pin 34 pivotally secures the handle 21 to mounting plate 36, which is connected to plate 16, as best shown in FIG. 2. The pin 34 provides a stationary pivot point and is the axis about which the entire handle 21 rotates.

The link 19, shown in FIG. 4, is provided with a single aperture 37 at one end and a plurality of apertures designated as 38, 39, 40, and 41 at the other end. The link 19 is connected to the arm 28 of crank element 18 by means of a pin 43 passing through aperture 37 of link 19 and aperture 29 of arm 28. A cotter pin 45 is shown in FIG. 1 passing through an aperture formed at the outside end of pin 43. A cotter pin arrangement (not shown) may also be provided on the inner end of pin 43 to secure against movement in the other direction.

The link 19 is connected to the handle 21, as shown in FIG. 1, by means of a pin 44 passing through aperture 41 of the link and through aperture 33 of the handle. A cotter pin 46 is shown passing through pin 44 to secure against longitudinal movement of the pin. A similar cotter arrangement may be provided on the inner end of the pin 44. A bolt 47 is shown extending from plate 26 a sufficient distance so as to provide a stop for the handle 21 when it moves in the clockwise direction about its pivot 34.

The operation of the present invention is as follows. Assume that, for any of a number of reasons including a change of belt cleaner blades, the elements of the tensioning arrangement have been moved to the unlocked position illustrated in FIG. 6 wherein the cleaner blades 17, 17a are out of engagement with the lower surface of the conveyor belt 11. When engagement is desired, the handle 21 is rotated in a clockwise direction around its pivot 34.

The mechanics of the tensioning arrangement of the present invention are simple and work on the premise of in-line forces to lock and sustain a constant force. As shown in FIG. 6, an imaginary line A, A' is drawn through the centers of the linear axes of pins 43 and 44. A similar imaginary line B, B' is drawn through the centers of the axes of the same two pins 43 and 44 in FIG. 1. It will be noted, however, that the angle of inclination of the lines A, A' and B, B' to the horizontal is different by virtue of the relative movement of the pins from the blade disengaged position shown in FIG. 6 to the blade engaged position shown in FIG. 1. It will also be noted that the position of the central axis of the pin 34 is below the line A, A' in FIG. 6, whereas the location of the same axis is above the line B, B' in FIG. 1. It is also to be noted that the central axis of the pin 34 remains stationary and is at the same position in FIGS. 1 and 6.

As the handle 21 is forced to rotate in a clockwise direction about its pivot 34 from the position shown in FIG. 6, the pin 44, which extends through the link and the handle, is caused to move downwardly in a clockwise arc about the pivot 34. This motion causes the pin 43 to move in an arc in a counterclockwise direction about the central axis of the shaft 12. This movement causes a corresponding counterclockwise movement of the arm 28, the hub 22, and the shaft 12 until the cleaner blades 17, 17a engage the lower surface of the conveyor belt 11 and assume the belt-cleaning position, as shown in FIG. 1.

The maximum force urging the blades against the belt is generated when the pins 43 and 44 lie on the same plane as the center of the pivot 34. This situation occurs when a straight line passes through the centers of pin 43, pivot 34, and pin 44. When all three points are in-line, the maximum belt-engaging force is applied by the blades. This alignment would occur if the handle 21 in FIG. 1 were rotated counterclockwise a slight amount. When the handle 21 is rotated clockwise past this point to the point shown in FIG. 1, such that the line B, B' passes slightly below the center of the pivot 34, the elements are over-center and the resultant camming effect locks the blades into the cleaning position preventing disengagement of the blade from the belt regardless of the direction of conveyor belt travel. The stop 47 prevents further rotation of the handle 21 in the clockwise direction and prevents reduction in the magnitude of the force urging the cleaner blade into contact with the conveyor belt.

The magnitude of the force applied by the blade against the conveyor belt may be adjusted by varying the connection between the handle 21 and the link 19. The maximum locking force is achieved by inserting pin 44 through aperture 41 in link 19 and aperture 33 in handle 21. The minimum engaging force is achieved by inserting pin 44 through aperture 38 in link 19 and aperture 33 in handle 21. To progressively increase the engaging force, the pin may be inserted alternately through apertures 38, 39, 40, and 41. It should be noted that the positioning of the main frame relative to the belt prior to the engagement of the tensioning unit will determine the magnitude of the forces.

It is apparent that in certain environments it may be more convenient to have the handle move in a counterclockwise direction for engagement depending upon the space, access, and interference of other elements. In that type of installation the position of the elements could be reversed to achieve the same result. The crank element could be mounted so that the arm 28 extends forwardly, as opposed to the rearward mounting shown in FIG. 1. The position of the handle could be reversed from the position of FIG. 1 so that the pivot point 34 is in front of the handle, as opposed to behind it, as shown in FIG. 1. Various other modifications could be made to the tensioning arrangement which would also achieve the same result. For example, the plurality of apertures 38, 39, 40, and 41 could be provided at the other end of the link with the single aperture 37 formed on the end which connects the handle and the link. Alternatively, the orientation of the link 19 could be reversed so that the plurality of apertures are arranged for connection with the arm 28.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A tensioning arrangement for a conveyor belt cleaner including a support shaft mounted for rotation about a first axis and disposed transverse to the direction of conveyor belt travel, one or more belt cleaner blades mounted on said support shaft adapted, in a first position, to contact the surface of said belt and adapted, in a second position, to be out of contact with said belt, a crank element having a hub connectable to said shaft for rotation therewith and a radially extending arm, a handle pivotally mounted for rotation about a second axis, link means connectable between said arm of said crank and said handle and means to interconnect said handle, said link, and said arm of said crank in an over-center camming arrangement such that upon rotation of said handle in a belt-engaging direction, said blade will engage said belt and upon further rotation of said handle in the same direction, said blade will be positively locked in place for either direction of conveyor belt travel.

2. A tensioning arrangement for a conveyor belt cleaner as in claim 1 whereby said link means is connectable between said arm of said crank and said handle at any of a number of predetermined points to vary the force exerted by said blade against said belt.

3. A tensioning arrangement for a conveyor belt cleaner as in claim 2 in which said means to connect said handle, said link, and said arm of said crank include a plurality of apertures formed at one end of said link and an aperture formed toward one end of said handle and a pin disposed through said aperture in said handle and through one of said apertures in said link.

* * * * *